United States Patent
Ride et al.

[15] 3,675,870
[45] July 11, 1972

[54] ELECTRICALLY OPERATED FISHING REEL

[72] Inventors: Jean-Louis Ride, 4 Rue Turenne, Geispolsheim-Gare; Roland Bellaton, 8 Place Sainte-Luc, Sainte-Foy-Les-Lyon, both of France

[22] Filed: July 9, 1970

[21] Appl. No.: 53,415

[30] Foreign Application Priority Data

July 11, 1969 France..................................6923628

[52] U.S. Cl. .....................................242/84.1 A, 242/84.3
[51] Int. Cl. .........................................................A01k 89/00
[58] Field of Search ..........................242/84.1 A, 84.3; 43/21

[56] References Cited

UNITED STATES PATENTS

| | | |
|---|---|---|
| 3,030,046 | 4/1962 | Moghadam....................242/84.1 A X |
| 3,437,282 | 4/1969 | Honkonen et al...........242/84.1 A UX |
| 3,248,819 | 5/1966 | Stealy............................242/84.1 A X |
| 2,251,123 | 7/1941 | Fanshier......................242/84.1 A UX |
| 2,175,756 | 10/1939 | Maury..................................242/84.3 |
| 2,609,160 | 9/1952 | Van Sciver et al....................242/84.3 |

*Primary Examiner*—Billy S. Taylor
*Attorney*—Alexander & Dowell

[57] ABSTRACT

An automatic fishing reel for fly fishing having a constant rewinding torque and constant angular speed. The reel is provided with a small electrical machine which functions as a dynamo brake to control the unwinding of line from the reel drum and as a motor to rewind it. Preferably the electric machine is of the inducer type having a permanent magnet and controlled by a switch to connect it to a battery to cause it to function as a motor, or short circuited directly or through a resistance to function as a dynamo brake.

10 Claims, 7 Drawing Figures

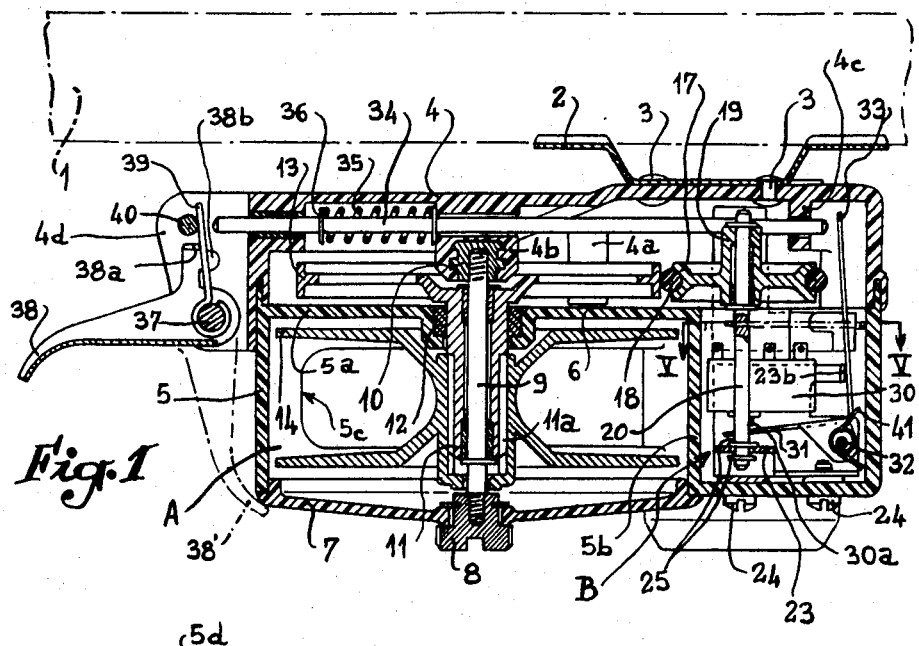

ELECTRICALLY OPERATED FISHING REEL

The present invention concerns a reel especially designed for fly fishing.

One of the known automatic types of such reels comprises a spool of which the mean plane passes through the axis of the rod, this spool being enclosed in an appropriate casing with a lateral aperture for the passage of the line. Attached to the reel is a spiral spring so arranged that it is wound up as the angler unwinds the line. The spring ensures a recoil torque permitting this line to be rewound when the angler wishes it.

This conventional spiral spring device has two major disadvantages. On the one hand, unless the dimensions of the spring are excessively large, the spool can only make a very limited number of revolutions. On the other hand, the recoil torque which it ensures is not constant; it is at a maximum when the line is completely unwound and at a minimum when it is completely rewound.

It is an object of this invention to overcome the above-mentioned disadvantages and to provide a fly fishing reel in which the number of revolutions of the spool is unlimited.

Another object of this is to provide such a reel in which the torque opposing the unwinding of the line is proportional to the speed of this latter and regardless of the length of line already unwound.

Still a further object of this invention is to provide a reel of the type in question in which the rewinding of the line occurs at a constant torque and at a constant angular speed under all fishing conditions.

According to a first feature of the invention, the spool of the reel is connected to a small electric machine, which may function either as a dynamo brake to control the unwinding of the line, or as a motor to rewind it.

This electric machine should preferably be of the direct current type with a permanent field magnet and controlled by a small switch by means of which it may be connected to the battery to make it operate as a motor, or short circuited directly or through a suitable resistance to make it operate as a dynamo brake. The switch may be activated by means of a small catch which the user can easily manipulate using one of the fingers holding the rod.

According to another characteristic of the invention, the spool is mounted rotating about an axis situated radially with respect to that of the rod. The apparatus is thus entirely symmetrical with respect to a plane axial to the rod so that by providing in the wall of the casing two lateral apertures which are also symmetrical with respect to the aforesaid plane, this apparatus may be instantly adapted for a left or right-handed user by means of a simple inversion of the feed polarity of the electric machine when same is operating as a motor.

In a preferred embodiment, the reel comprises a main casing which is encased below a base fixed to the rod. This casing is itself divided into two chambers, one enclosing the spool, while in the other, the electric machine, its feed battery and the control switch are inserted under water-tight conditions. The spool is removably mounted on a sleeve which passes through the upper wall of the casing to carry under the base an outlet friction wheel which an intermediate wheel connects to an inlet friction pinion mounted on the end of the shaft of the electric machine, which pulley is urged by a spring against the two members with which it cooperates.

IN THE ANNEXED DRAWING

FIG. 1 is a general longitudinal section of a reel constructed according to the invention;

FIG. 2 is an overhead view, with the base partially removed. Line I—I in this FIG. 2 designates the plane of section corresponding to FIG. 1;

FIG. 5 is a detail section taken along lines V—V (FIG. 1);

Figure 4:
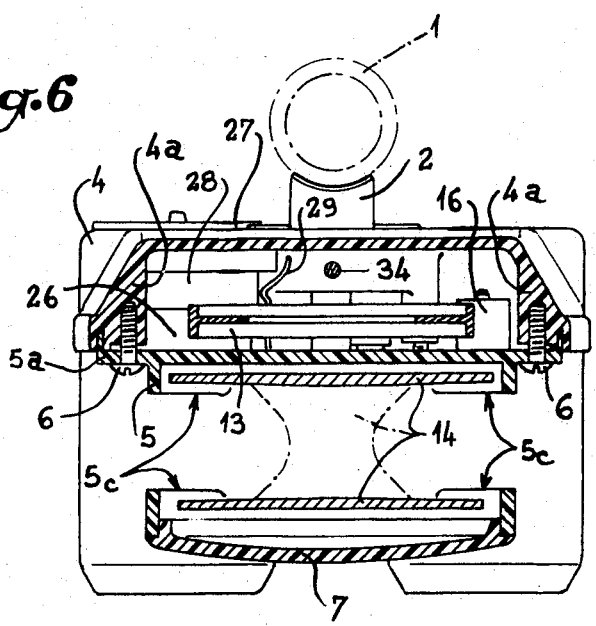

In FIG. 1 there is shown in dash and dot lines a portion 1 of any appropriate type of fishing rod. On this rod, there is a support 2 consisting of a U-shaped brace of which the ends are turned down and curved in a crosswise direction so as to surround the rod 1 and to be secured thereto by any appropriate means, for example by ties, rings, etc. Rivets 3 connect the central part of the support 2 to the first side of a base 4, preferably made of plastic material. The lower edge of this base is notched forming a groove in which the thin upper edge of a casing 5, also of plastic material, is inserted. As may be seen in FIG. 4, the casing 5 comprises an upper end wall 5a having the same profile as the base 4 in a plan view, but below this wall, the casing becomes narrower, forming two recesses which permit the insertion of the screws 6 which, crossing the aforesaid wall 5a, are screwed into the bosses 4a of the base 4.

The inside of the casing 5 is divided into two parts by a substantially transverse inner arcuate partition 5b, i.e., into a front chamber A and a rear chamber B.

The front chamber A has in plan view the profile of a cylinder, the partition 5b being curved accordingly, thus forming below the wall 5a the aforesaid recesses designed to lodge the screws 6. The upper end of chamber A is entirely closed by the above-mentioned upper wall 5a, while its open lower end has a dome-shaped cover 7, held in place by a nut 8 in the form of a milled button, which is screwed onto the lower end of a spindle 9 of which the upper end is secured to the base 4 so as to extend from the second side thereof, radially with respect to the axis of rod 1. In the example shown, this spindle 9 is screwed into a nut 10 moulded into a boss 4b of said base. The nut 8 and the spindle 9, of which it constitutes the second centering support, thus help to ensure that the casing remains secured to the base, while allowing easy access to the inside of the chamber A when this is desired.

A cylindrical sleeve 11 rotatably mounted on the spindle 9 extends through a ball bearing 12 mounted in the upper wall a smooth rimmed outlet 5a wheel to carry 13 which is thus able to rotate within the watertight intermediate space defined between the said wall 5a and the bottom of the base 4. The sleeve 11 is grooved, as shown by 11a, to removably receive the hub, grooved in a similar fashion, of a spool 14 intended to support the reel line. As shown, the lateral walls of the casing 5 have two broad apertures 5c which extend rearwards up to the aforesaid partition 5b.

Figure 3:
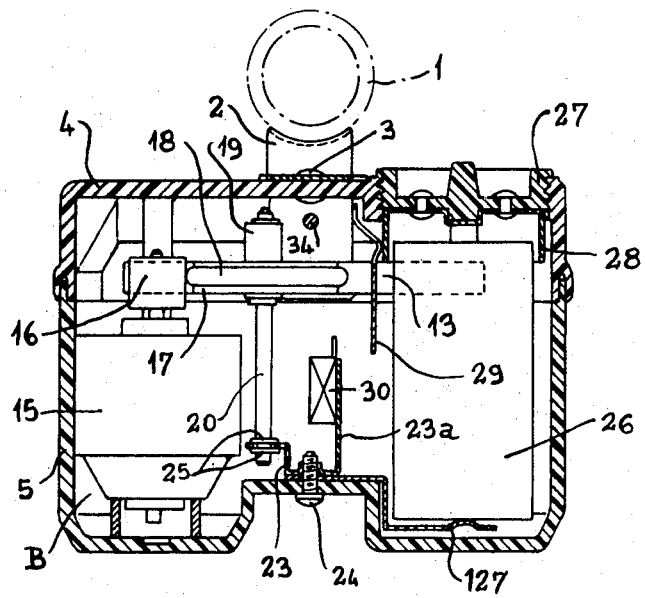
FIGS. 3 and 4 are sections taken along lines III—III and IV—IV respectively (FIG. 2)

The chamber B has a slightly curved shape so as to surround the rear portion of the partition 5b. Its lower end is closed, while its upper end is completely open and communicates with the aforesaid intermediate space. At one of its lateral ends (left end for the angler) this chamber encloses an electric motor 15 having a vertical axis, this motor being of the permanent field magnet type, and having its shaft is provided on its upper end with a smooth inlet pinion 16 of small diameter. This pinion is connected to the outlet wheel 13 by means of a small intermediate wheel 17 of which the rim has a frictional type 18 (for example a rubber padding). The intermediate wheel 17 is solid with to a boss 19 mounted loosely on a vertical axis 20. To ensure pressure by the type 18 on the pinion 16 and the wheel 13, a wire spring 21 (FIG. 5) is provided which crosses the said axis 20 and surrounds a small boss 5d connected to the wall of the casing 5, its end opposite the axis 20 rubbing against this wall. It is seen that the axis 20 may thus be urged in the direction indicated by the arrow 22, bringing it into contact with the pinion 16 and the wheel 13 to ensure transmission of motion. The lower end of the axis 20 crosses a bracket 23 (FIGS. 1 to 3) fixed to the bottom of the casing 5 by means of screws 24 and it is held vertically with respect to this bracket by means of split rings 25. The opening provided on the bracket 23 is considerably larger in diameter than the axis 20 so as to permit the free self centering of this latter.

In the other lateral end of the chamber B (right end for the angler), there is disposed a dry cell battery to supply current to the motor 15. In order to permit the insertion of this battery, the base 4 has a threaded aperture of which the diameter is greater than that of the battery and is adapted to receive a watertight cover 27 of which the lower side is connected to a sort of metal cowl 8 which surrounds the upper end of the battery 26. As usual, the lower end of the battery 26 comprises a metal surface forming a negative pole. This surface is applied against a resilient plate 127 also held in place by the screws 24. As regards the positive pole of the battery 26, formed by the upper end of the carbon rod of this latter, it engages the bottom of the metal cowl 28, the lateral skirt of this cowl in turn bearing against a vertical resilient plate supported by the casing 5.

In the central portion of the chamber B, in the immediate vicinity of the axis 20 there is provided a microswitch 30, attached to a vertical lug 23a raised from the bracket 23 described previously. This microswitch is connected by appropriate wires (not shown) to both poles of the battery 26, as well as to one of the two brushes of the motor 15, the other being connected to one of the poles of the battery.

The microswitch 30 comprises a lower actuating button 30a (FIG. 1). To operate this button, there is provided a flat lever arm 31 pivoted at 32, this arm being solid with another lever arm 33 which rises vertically along the rear lateral wall of the casing 5 and of the base 4. The upper end of the arm 33 may receive the action of a horizontal rod 34 which crosses the front lateral wall of the base 4, the boss 4b, above the nut 10 and a flange 4e connected to the bottom of the base. This rod 34 undergoes the action of a biassing spring 35 inserted between the boss 4b and a split ring 36 mounted on the rod, so that the rear end of this latter normally remains spaced from the arm 33. On the other hand, the base 4 extends forwardly in the form of a cowl 4d crossed by an axis 37 on which is mounted a catch 38 having a U profile. Between the two branches of the catch 38, the axis 37 carries a flat rotating lever 39 which can actuate the rod 34, the end of at least one of the branches of the catch 38 being folded at right angles as shown in 38a, to ensure the movement of the lever 39. A stop 40 limits the forward displacement of the lever 39.

At rest, the catch 38 is turned down against the casing 5 (position shown in 38' in FIG. 1). To actuate the microswitch 30, it is first raised to the normal position, so that the folded portion 38a may act on the lever 39. It is understood that if the catch is further raised the rod 34 slides backwards against the spring 35 which has for its effect to rotate lever arms 31 and 33 in a clockwise direction about the axis 32, thus ensuring that the button 30a is operated. Any excessive action of the catch, which could deform the double lever 31–33, is prevented by two stops 38b extending from the branches of the catch and which bear against the edge of the base. Each stop 38b is preferably provided with a light inner boss (not shown) able to form a resilient snapping mechanism for the lever 39.

To eliminate dead motions there is preferably provided a torsional spring 40 on the double lever 31–33 to hold it against a stop 23b folded at right angles from the lug 23a described above.

Figure 6:
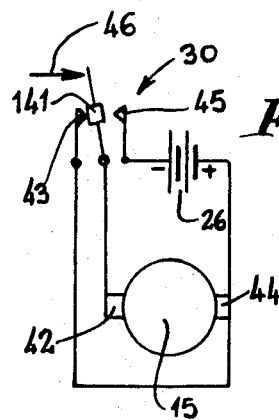
FIGS. 6 and 7 are electrical diagrams illustrating the operation of the reel.

FIG. 6 shows a diagram of the electrical connections. The movable contact 141 of the microswitch 30 is connected to one 42 of the brushes of the motor 15. The fixed contact 43 on which it normally rests is connected to the other brush 44. The second fixed contact 45 of the microswitch 30 is connected to one of the poles (negative pole in FIG. 6) of the battery 26, the other pole (positive pole) being for its part connected to the second brush 44 and consequently, to the contact 43.

When the catch 38 is not actuated (position as in FIG. 6), the battery 26 is isolated and the motor 15 is short circuited. If the angler pulls on the line of the spool 12, this spool rotates together with the motor 15. As the motor has a permanent field magnet, it then operates as a dynamo brake to control the unwinding of the line with a torque which is strictly proportional to the speed of this unwinding. It is easily seen that this electric braking in no way limits the length of line supported by the spool 12, in contradistinction to what occurs with the spiral springs of known apparatus which wind as the line unwinds.

When the catch 38 is manipulated, it acts on the movable contact 41 in the direction of the arrow 46 to make it cooperate with the other fixed contact 43 connected to the negative pole of the battery 26. Thus the motor 15 is fed and it rotates in the desired direction to ensure the rewinding of the line onto the spool 12, this rewinding also being effected with a constant torque.

Figure 7:
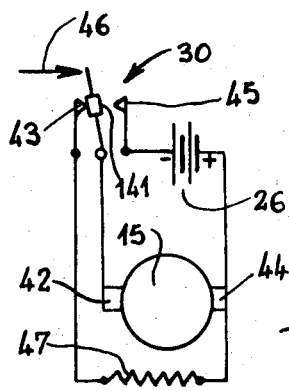

In the modification shown in FIG. 7, a resistance 47 has been placed on the circuit connecting the fixed contact 43 to the brush 44 of the motor 45. This resistance remains inactive when the motor is being fed by the battery; it does not therefore reduce the rewind torque. On the other hand, during unwinding, it limits the short circuit current of the motor 15 operating as a dynamo brake, which may be useful in the case of a motor with low ohmic resistance, which would tend to create a too high braking torque.

The invention has therefore permitted to provide a fly fishing reel in which the length of the line already unwound has no effect either on the braking torque which opposes unwinding, or on the motor torque which ensures rewinding. The number of revolutions which the spool can make, and consequently, the length of M.W.) line it can hold, are limited only by the dimensions of the apparatus. It is further seen that aside from the internal arrangement of the chamber B (which does not affect operation), this apparatus is entirely symmetrical with respect to an axial plane of the rod, so that the line may exit through the aperture 5c on the right, or through that on the left, while by reversing the feed polarity, simply i.e., turning the battery 26 around in its housing, the motor 15 may rotate in the direction corresponding to the selected exit and entry side of the line. It result therefrom that the reel is immediately adaptable to a left-handed angler, who may use it in exactly the same manner as a right-handed angler.

In addition, the spool may be replaced very easily and rapidly, since it is merely necessary to manipulate the nut 8 which, as is shown, may be retained axially an the cover 7 by means of a split ring or similar device.

It is understood that the battery 26 may be substituted by any other appropriate source of electricity. The friction wheels or pinions may be replaced by gears.

We claim:

1. A fishing reel comprising:
   a substantially flat base having a first side and a second side;
   means on the first side of said base to secure same to a fishing rod with said base substantially situated in a plane parallel to said rod, said rod then defining for said base an outer axis;
   a casing having a first end wall secured to the second side of said base and a second end wall connected with said first end wall by lateral walls formed with two apertures, said casing being substantially symmetrical with respect to a mean longitudinal plane of symmetry perpendicular to said base and passing through said outer axis;
   a spindle carried by said base and extending therefrom radially and outwardly with respect to said outer axis, said spindle passing through the first and second end walls of said casing and having a threaded end protruding beyond same;
   an outer nut screwed on the threaded end of said spindle and acting on said second end wall of said casing to apply said first end wall thereof against the second side of said base;
   a spool rotatably mounted on said spindle within said casing;
   an electric motor mounted within said casing to rotate said spool;
   motion transmitting means interposed between said motor and said spool;
   an electric source to energize said motor;
   and switching means operatable from the outside of said casing and of said base to control current supply from said source to said motor.

2. In a fishing reel as claimed in claim 1, said second wall of said casing having an aperture for introduction of said spool thereinto, said aperture being closed by a removable cover forming a portion of said second wall through which said spindle extends, and said outer nut acting on said removable cover to press same against said first end wall.

3. A fishing reel as claimed in claim 1 further comprising a sleeve interposed between said spindle and said spool, said sleeve being rotatable on said spindle, said spool being removably mounted on said spindle to rotate therewith, and said sleeve being interposed between said spool and said motion transmitting means.

4. In a fishing reel as claimed in claim 3, said first end wall of said casing being spaced from the second side of said base to define therewith an intermediate space, said sleeve including a portion which extends through the first end wall of said casing into said intermediate space, and said motion transmitting means embodying an outlet wheel carried by said portion of said sleeve within said intermediate space.

5. In a fishing reel as claimed in claim 4, a bearing interposed between said sleeve and said upper wall.

6. In a fishing reel as claimed in claim 4, said casing being formed with a substantially transverse inner arcuate partition extending between said lateral walls to define therewith a first substantially cylindrical chamber for said spool and a second chamber for said electric motor and for said electric source.

7. In a fishing reel as claimed in claim 5, said upper wall of said casing only extending across said first chamber to leave free communication between said second chamber and said intermediate space for said motion transmitting means.

8. In a fishing reel as claimed in claim 7, said outlet wheel being in the form of a friction wheel, said electric motor and said outlet wheel having substantially parallel axes, said motor carrying an inlet friction pinion disposed substantially in the same mean plane as said outlet wheel, and said casing rotatably carrying an intermediate friction wheel which connects said inlet pinion with said outlet wheel.

9. In a fishing reel as claimed in claim 8, means to resiliently urge said intermediate friction wheel against said inlet pinion and said outlet wheel.

10. In a fishing rod as claimed in claim 1, said switching means comprising:
- a switch carried by said casing, said switch having an actuating member;
- an outer operating arm pivoted to said base;
- a rod slidably carried by said base, said rod having an outer end and an inner end, with said outer end being actuatable by said operating arm;
- and lever means interposed between the inner end of said rod and the actuating member of said switch.

* * * * *